(12) United States Patent
Irsa (10) Patent No.: US 11,795,762 B2
(45) Date of Patent: Oct. 24, 2023

(54) REAMER BLOCK WITH CUTTER POCKET HOLDERS

(71) Applicant: Smith International, Inc., Houston, TX (US)

(72) Inventor: Juraj Irsa, Spring, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/130,116

(22) Filed: Dec. 22, 2020

(65) Prior Publication Data
US 2021/0198951 A1 Jul. 1, 2021

Related U.S. Application Data

(60) Provisional application No. 62/955,165, filed on Dec. 30, 2019.

(51) Int. Cl.
*E21B 10/32* (2006.01)
*B33Y 80/00* (2015.01)

(52) U.S. Cl.
CPC .............. *E21B 10/32* (2013.01); *B33Y 80/00* (2014.12)

(58) Field of Classification Search
CPC .......... E21B 10/26; E21B 10/32; E21B 10/62; E21B 10/43
See application file for complete search history.

(56) References Cited

U.S. PATENT DOCUMENTS

| 2010/0175927 A1 | 7/2010 | Zulak |
| 2012/0012398 A1* | 1/2012 | Hall ........................ E21B 10/32 |
| | | 175/230 |
| 2014/0048336 A1 | 2/2014 | Mensa-Wilmot |
| 2016/0319604 A1 | 11/2016 | Oesterberg et al. |
| 2017/0058611 A1* | 3/2017 | Lin, Jr. .................... E21B 10/32 |
| 2019/0055786 A1* | 2/2019 | Trunk ................... E21B 10/567 |
| 2020/0123858 A1 | 4/2020 | Zhang |

FOREIGN PATENT DOCUMENTS

| WO | 2015167788 A1 | 11/2015 |
| WO | 2017223259 A1 | 12/2017 |
| WO | WO-2018222436 A1 * | 12/2018 ............. E21B 10/43 |

OTHER PUBLICATIONS

Extended European Search Report issued in European Patent Application No. 20217811.7 dated Apr. 8, 2021, 5 pages.

* cited by examiner

*Primary Examiner* — Caroline N Butcher (57) ABSTRACT

A reamer includes a plurality of cutter pocket holders. The cutter pocket holders are separately manufactured and connected to a body of the reamer. The cutter pocket holders include a plurality of cutter pockets, into which cutting elements may be inserted. A radially rearward cutter pocket holder may include front-loading cutter pockets.

19 Claims, 9 Drawing Sheets

REAMER BLOCK WITH CUTTER POCKET HOLDERS

CROSS-REFERENCE TO RELATED APPLICATIONS

This application claims the benefit of, and priority to, U.S. Patent Application No. 62/955,165 entitled "Reamer Block with Cutter Pocket Holders," filed on Dec. 30, 2019, which is incorporated herein by this reference in its entirety.

BACKGROUND OF THE DISCLOSURE

Downhole drilling activities may include drilling a pilot hole and reaming the pilot hole to an expanded diameter. Reamer blocks may include cutter pockets for cutting elements. Each reamer block may be individually and uniquely manufactured for a specific operator and/or wellbore, which may result in expensive inventories, or long lead times to replace broken reamer blocks. Reamer blocks may include multiple rows of cutting elements. The cutting elements may be brazed to the reamer block.

SUMMARY

In some embodiments, a reamer block includes a body and a cutter pocket holder connected to the body. The cutter pocket holder includes a plurality of cutter pockets. In some embodiments, the reamer block includes more than one cutter pocket holder. A second cutter pocket holder is located rotationally behind the first cutter pocket holder on the body.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure is generally related to devices, systems, and methods for reamer blocks and other expandable tool blocks. Reamer blocks may include one or more cutting elements. For example, a reamer block may include one or more rows of cutting elements. According to embodiments of the present disclosure, a reamer block may include a cutter pocket holder connected to a body of the reamer block. The cutter pocket holder may include a plurality of cutter pockets. Individual cutting elements may be inserted into the cutter pockets, and the cutter pocket holder connected to a reamer body. In this manner, a standard reamer body may be developed, and individual cutter pocket holders designed according to the unique conditions of a wellbore and preferences of an operator. This may reduce manufacturing costs, increase the ease of inventory management, and allow for customization of the cutting element profile and/or pattern.

Figure 1:
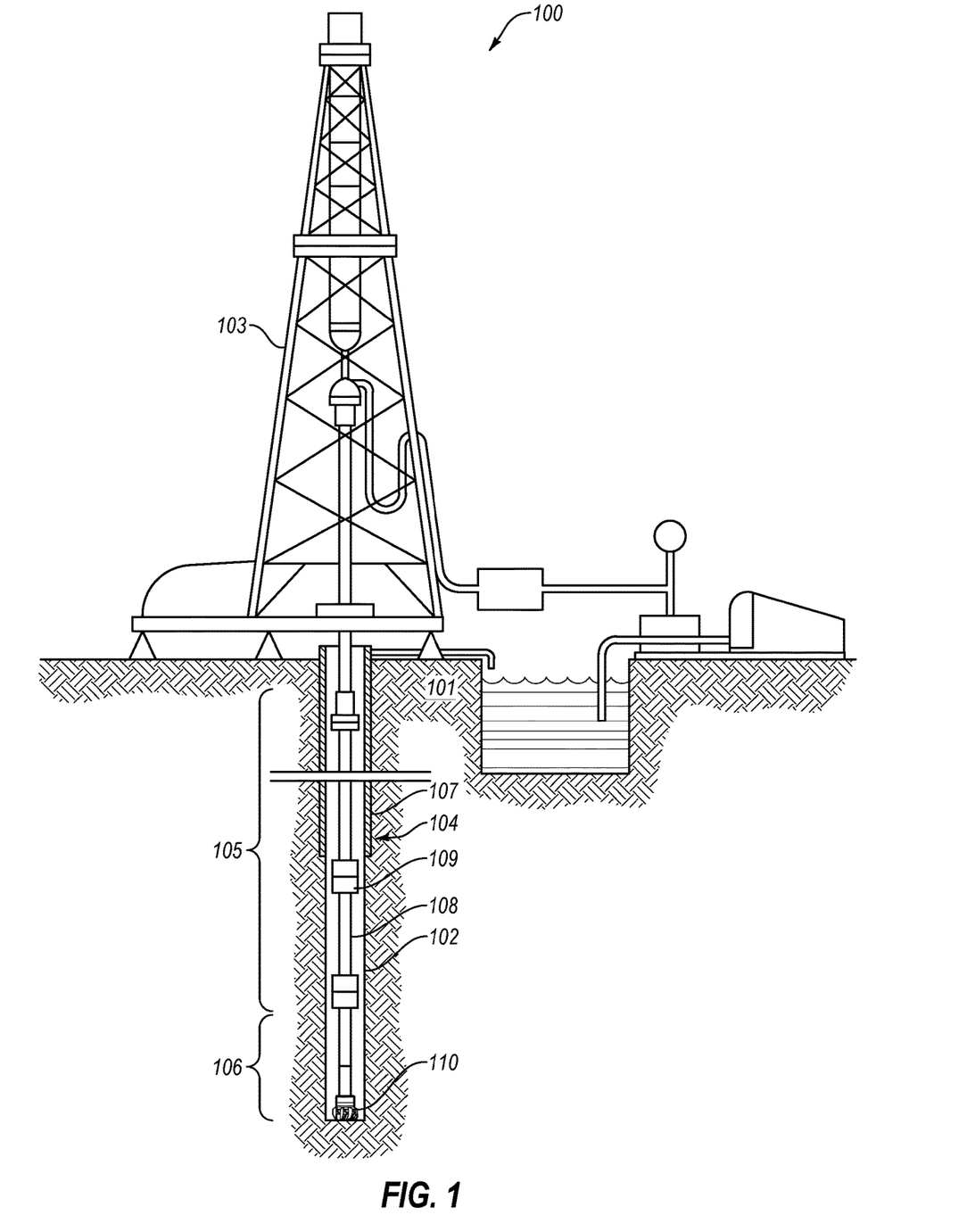
FIG. 1 is a representation of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
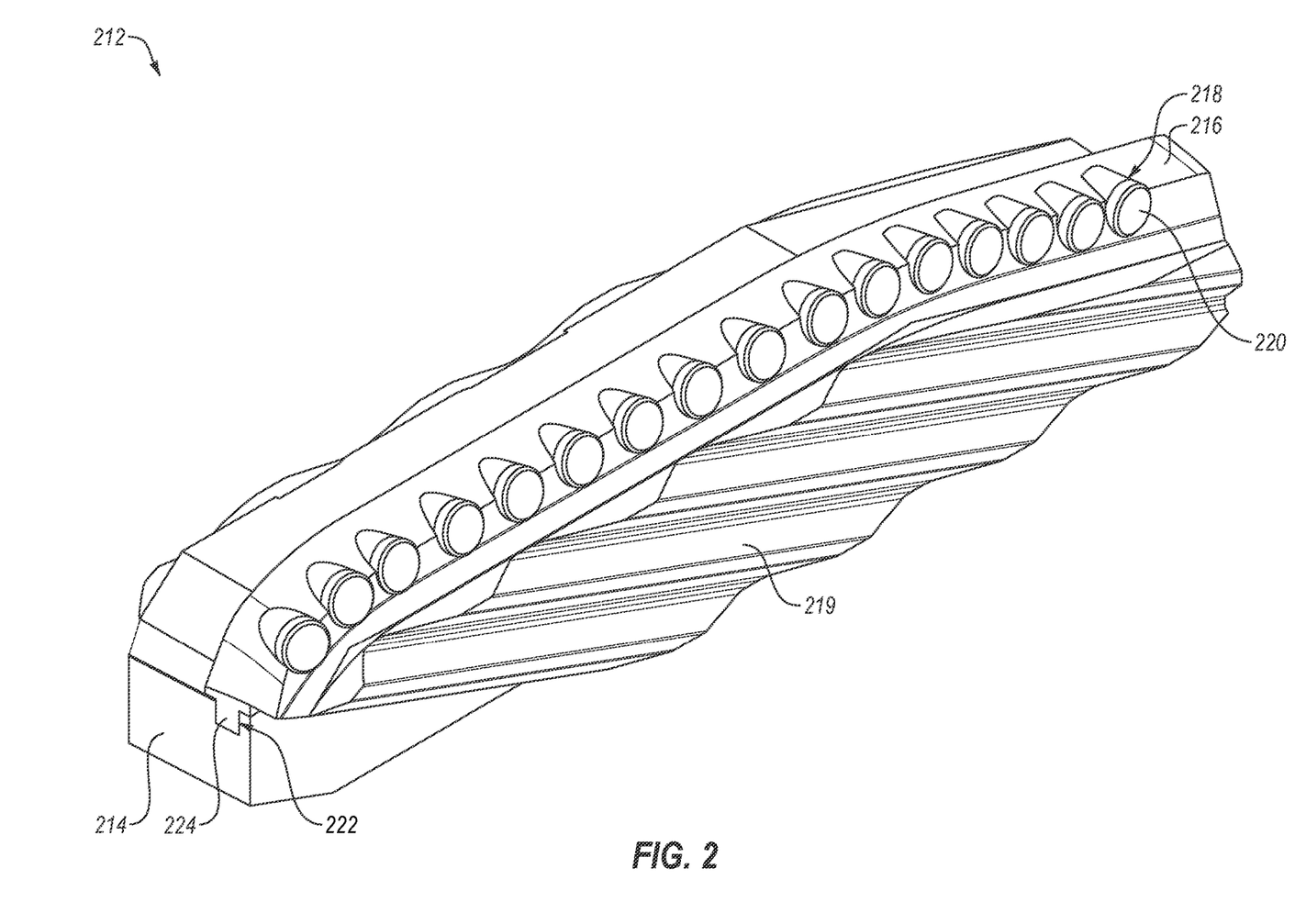
FIG. 2 is a representation of a perspective view of a reamer block, according to at least one embodiment of the present disclosure.

FIG. 2 is a representation of a perspective view of a reamer block 212, according to at least one embodiment of the present disclosure. The reamer block 212 includes a body 214. A cutter pocket holder 216 is connected to the body 214. The cutter pocket holder includes a plurality of cutter pockets 218. A plurality of cutting elements 220 is inserted into the plurality of cutter pockets 218.

In some embodiments, the reamer block 212 may be inserted into a downhole tool, such as a downhole reamer. As the downhole reamer rotates, the cutting elements 220 may engage the formation to widen a borehole. In some embodiments, the reamer block 212 may be any cutting tool, including section mills, casing cutters, or other downhole cutting tool. In some embodiments, the downhole reamer may be an expandable downhole reamer. The reamer block 212 may be extended past the outer surface of a housing when an actuation force (e.g., a hydraulic actuation force) is applied to the reamer block 212.

The cutter pocket holders 216 are separate pieces from the body 214. In other words, the cutter pocket holders 216 are fabricated and/or manufactured separately from the body 214 and later connected to the body 214. In this manner, the body 214 may be a pre-fabricated body 214. Accordingly, many bodies 214 may be manufactured with the same size and shape, or a limited collection of sizes and shapes of bodies 214 may be manufactured.

The cutter pocket holder 216 may be manufactured separately and later installed on the body 214. This may allow customization of the cutter pocket holder 216. Because the body 214 is a pre-fabricated body 214, inventory management may be made easier. For example, a small number of shapes and/or sizes of bodies 214 may be manufactured. A larger number of cutter pocket holders 216 may be manufactured. The cutter pocket holders 216 may be mixed-and-matched to different shapes and/or sizes of bodies 214, which may result in many different options and variety of reamer blocks 212. This may reduce warehousing cost and complication. Furthermore, the body 214 includes a plurality of splines 219. The splines engage with splines on the housing of the downhole tool during engagement to extend the body 214 from the housing. In some embodiments, engagement and extension of the reamer block 212 may cause wear on the splines 219. If the splines 219 are worn, but the cutter pocket holder 216 and/or the cutting elements 220 are not worn, then the cutter pocket holder 216 may be removed from the worn body and replaced on an unworn body. This may help to reduce costs by not replacing the cutter pocket holder 216, which may be more expensive to manufacture.

While a single cutter pocket holder 216 is shown in FIG. 2, it should be understood that any number of cutter pocket holders 216 may be installed on the body 214. For example, one, two, three, four, five, six, seven, eight, nine, ten, or more cutter pocket holders 216 may be installed on the body 214.

In some embodiments, the cutter pocket holder 216 may be additively manufactured. In some embodiments, additively manufactured components may be constructed from more erosion and/or abrasion resistant materials than cast and/or machined components. Therefore, in some embodiments, the cutter pocket holder 216 may not include any applied hardfacing. In some embodiments, the cutter pocket holder 216 may be formed from any high-wear resistant material. In some embodiments, the cutter pocket holder 216 may be formed from carbide particles, such as tungsten carbide (WC), sintered in a copper or nickel alloy binder. In some embodiments, additively manufactured components may include fully or partially enclosed pockets and/or channels for sensors and fluid passage. In some embodiments, the cutter pockets 218 may be machined into the cutter pocket holder 216. In some embodiments, the cutter pockets 218 may be cast into the cutter pocket holder 216. In some embodiments, the cutter pockets 218 may be formed into a cutter pocket holder that is formed using a mold, a matrix powder, and an infiltrant (such as tungsten carbide powder and a cobalt infiltrant). In some embodiments, the cutter pockets 218 may be additively manufactured into the cutter pocket holder 216. In some embodiments, the cutter pockets 218 may be at least partially machined into the additively manufactured cutter pocket holder 216.

In some embodiments, the cutter pocket holder 216 may be connected to the body 214 using any mating connection. The mating connection may be any connection configured to retain the cutter pocket holder 216 to the body 214. The mating connection may include a pin and pocket, where the pin is in either the cutter pocket holder 216 or the body 214, a dovetail connection, a brazed connection, a welded connection, or any other mating connection. For example, the cutter pocket holder 216 may be brazed to the body 214, welded to the body 214, connected to the body 214 with one or more mechanical fasteners, connected to the body 214 with an interlocking connection, any other mating connection, and combinations thereof. In the embodiment shown in FIG. 2, the body 214 may include a receiving pocket 222. The cutter pocket holder 216 may include a connecting protrusion 224. The connecting protrusion 224 may be complementary to the receiving pocket 222. In other words, the connecting protrusion 224 may be inserted into the receiving pocket 222. In some embodiments, the receiving pocket 222 may have a receiving pocket profile (e.g., a receiving pocket cross-sectional shape) and the connecting protrusion 224 may have a connecting protrusion profile (e.g., a connecting protrusion cross-sectional shape), and the receiving pocket profile and the connecting protrusion profile may be the same (e.g., the receiving pocket cross-sectional shape and the connecting protrusion cross-sectional shape may be the same). In some embodiments, the connecting protrusion 224 may drop-in to the receiving pocket 222 (e.g., be moved radially inward and/or outward relative to each other). In some embodiments, the body 214 may include a connecting protrusion and the cutter pocket holder 216 may include a receiving pocket.

In some embodiments, brazing the cutting elements 220 to the cutter pocket holders 216, rather than to the body 214, may improve the quality of the braze. For example, vacuum brazing is a method of brazing where the parts to be brazed (e.g., the cutter pocket holder 216 and the cutting element 220) and the braze material are heated in a vacuum or low pressure environment. This may reduce the number of micro bubbles in the braze, which may thereby improve the strength of the braze. The cutter pocket holders 216 may be small enough to fit inside the vacuum brazing chamber.

In some embodiments, brazing the cutting elements 220 to the cutter pocket holder 216 may reduce the amount of post-brazing processing of the reamer block 212. For example, heat from the brazing process (e.g., heating the body, the cutting elements, and braze material to the melting temperature of the braze material) may cause deformation, warping, bending, or other change of shape to the reamer block. After brazing, any heat deformation of the reamer block may be machined away (possibly by hand) to return the reamer block to the final dimensions. By brazing the cutting elements to the cutter pocket holder 216 separately from the body 214, heat from the brazing process may only deform the cutter pocket holder 216. This may be because the body 214 is not heated during brazing. Therefore, the cutter pocket holder 216, which is smaller than the body 214, may be the only component of the assembly to experience heat deformation, if any at all. Therefore, a smaller amount of material may be deformed, and post-brazing processing may be reduced, eliminated, and/or automated. This may save manufacturing time and money.

In some embodiments, the receiving pocket 222 and the connecting protrusion 224 may at least partially retain the cutter pocket holder 216 onto the body 214. For example, the receiving pocket 222 may at least partially provide resistance to lateral and/or radial removal of the cutter pocket holder 216 from the body 214.

Figure 3:
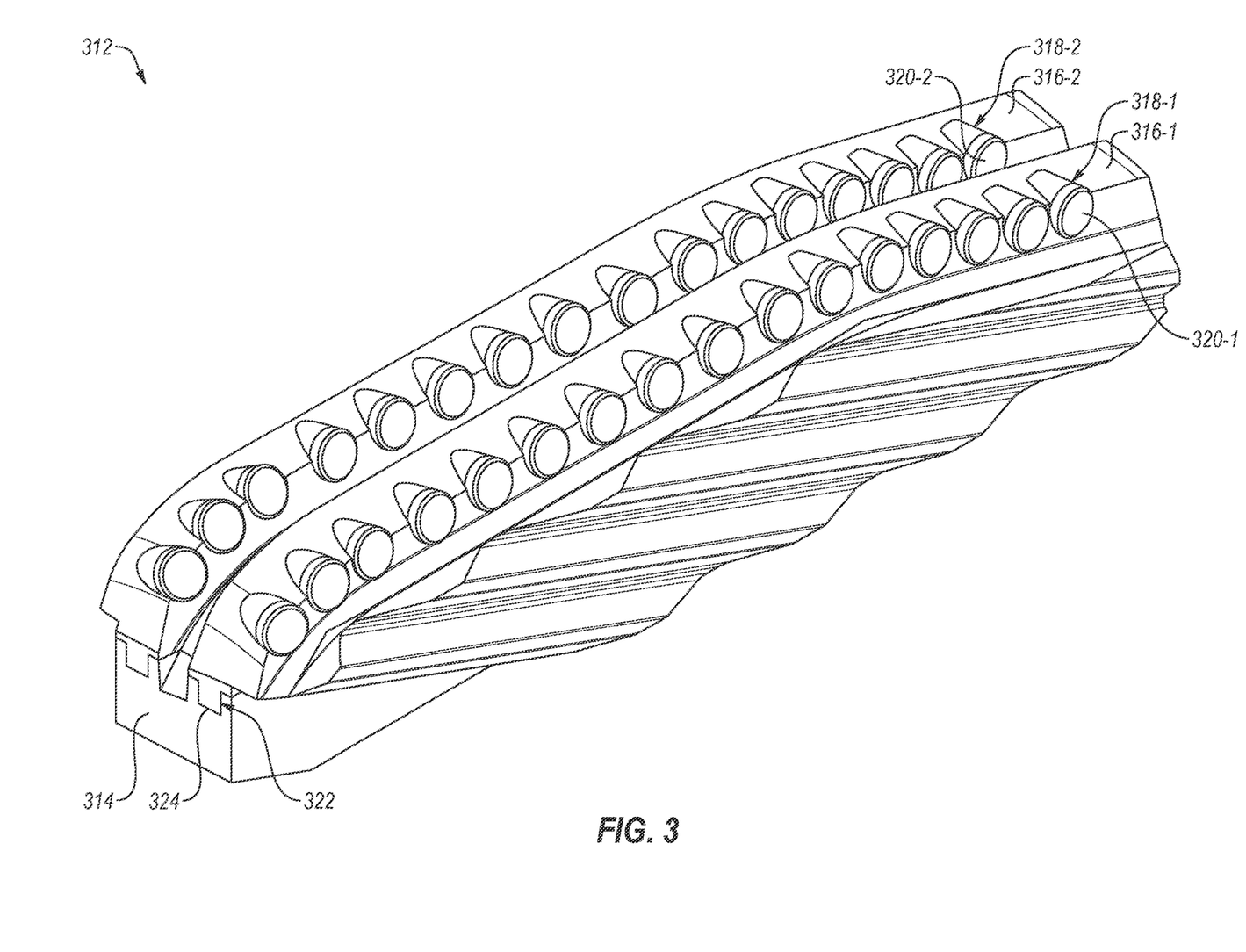
FIG. 3 is a representation of a perspective view of another reamer block, according to at least one embodiment of the present disclosure.

FIG. 3 is a representation of a perspective view of a reamer block 312, according to at least one embodiment of the present disclosure. The reamer block 312 includes a body 314. A first cutter pocket holder 316-1 and a second cutter pocket holder 316-2 (collectively 316) are connected to the body 314. The first cutter pocket holder 316-1 includes a first plurality of cutter pockets 318-1 and the second cutter pocket holder 316-2 includes a second plurality of cutter pockets 318-2 (collectively 318). In the embodiment shown, the first cutter pocket holder 316-1 is located rotationally ahead of the second cutter pocket holder 316-2. A first plurality of cutting elements 320-1 is inserted into the first plurality of cutter pockets 318-1 and a second plurality of cutting elements 320-2 (collectively 320) is inserted into the second plurality of cutter pocket holders 320-2.

The cutter pocket holders 316 are separate pieces from the body 314. In other words, the cutter pocket holders 316 are fabricated and/or manufactured separately from the body 314 and later connected to the body 314. In this manner, the body 314 may be a pre-fabricated body 314. Accordingly, many bodies 314 may be manufactured with the same size and shape, or a limited collection of sizes and shapes of bodies 314 may be manufactured. Similarly, many cutter pocket holders 316 may be manufactured. In some embodiments, the first cutter pocket holder 316-1 may be the same as the second cutter pocket holder 316-2. In some embodiments, the first cutter pocket holder 316-1 may be different from the cutter pocket holder 316-2. The cutter pocket holders 316 may be manufactured separately and later installed on the body 314. This may allow customization of the cutter pocket holders 316. Because the body 314 is a pre-fabricated body 314, inventory management may be made easier. For example, a small number of shapes and/or sizes of bodies 314 may be manufactured. A larger number of cutter pocket holders 316 may be manufactured. The cutter pocket holders 316 may be mixed-and-matched to different shapes and/or sizes of bodies 314, which may result in many different options and variety of reamer blocks 312. This may reduce warehousing cost and complication. While two cutter pocket holders 316 are shown in FIG. 3, it should be understood that any number of cutter pocket holders 316 may be installed on the body 314. For example, one, two, three, four, five, six, seven, eight, nine, ten, or more cutter pocket holders 316 may be installed on the body 314.

Figure 4:
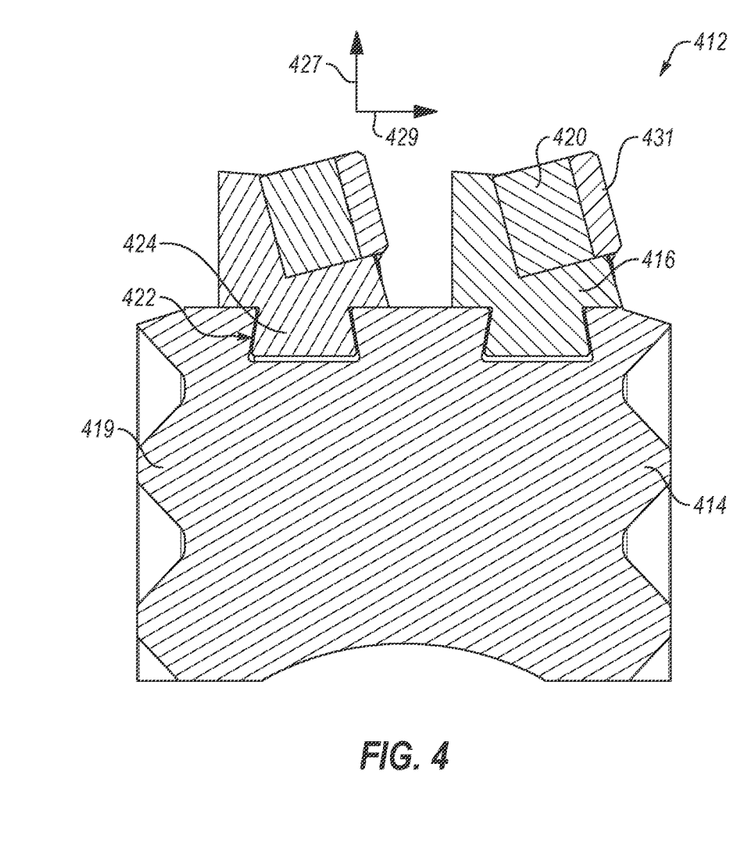
FIG. 4 is a representation of a cross-sectional view of a reamer block, according to at least one embodiment of the present disclosure.

FIG. 4 is a representation of a cross-sectional view of a reamer block 412, according to at least one embodiment of the present disclosure. In the embodiment shown, the receiving pocket 422 at least partially provides resistance to radial removal from the body 414. The receiving pocket 422 shown is a dovetail pocket and the connecting protrusion 424 shown is a dovetail pin. The dovetail pin of the connecting protrusion 424 may be complementary to the dovetail pocket of the receiving pocket 422. Thus, the dovetail pin may slide into the dovetail pocket. This dovetail connection may provide a strong resistance to radial removal (e.g., movement in the radial direction 427) of the cutter pocket holders 416 from the body 414. In some embodiments, the cutter pocket holder 416 may be brazed to the body 414 at the dovetail connection. In some embodiments, a mechanical fastener and the dovetail connection may connect the cutter pocket holder 416 to the body 414.

The body 414 includes a plurality of splines 419. The splines 419 help to direct the body 414 in the radial direction 427 based on longitudinal movement (e.g., into and out of the page). The cutting elements 420 include a cutting face 431. The cutting face of the cutting elements 420 may engage the formation as the body 414 rotates in the circumferential direction 429. Thus, when extended (e.g., when the body 414 is moved longitudinally in the housing, and the splines 419 extend the body 414 in the radial direction 427), the cutting elements 410 may be extended to the formation, and the cutting face 431 may engage and degrade the formation. In this manner, the reamer block 412 may widen a borehole.

Figure 5:
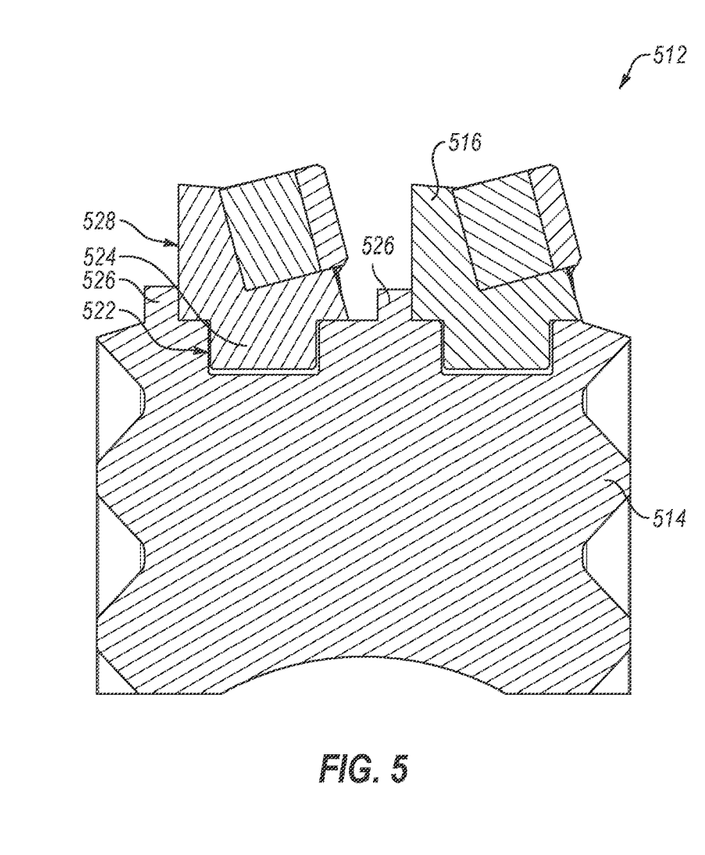
FIG. 5 is a representation of a cross-sectional view of another reamer block, according to at least one embodiment of the present disclosure.

FIG. 5 is a representation a cross-sectional view of another reamer block 512, according to at least one embodiment of the present disclosure. In the embodiment shown, the body 514 includes a receiving pocket 522, and a connecting protrusion 524 of a cutter pocket holder 416 is extended into the receiving pocket 522. The receiving pocket 522 includes a ridge 526 rotationally behind the cutter pocket holder 516. The ridge 526 may support a rear wall 528 of the cutter pocket holder 516. This may help to prevent the cutter pocket holder 516 from toppling or otherwise being dislodged from the body 514. In some embodiments, the cutter pocket holder 516 may be brazed to the body 514 at the receiving pocket 522. In some embodiments, one or more mechanical fasteners and the receiving pocket 522 may connect the cutter pocket holder 516 to the body 514. The one or more mechanical fasteners may extend in the radial and/or circumferential direction to connect the cutter pocket holder 516 with the body 514.

Figure 6:
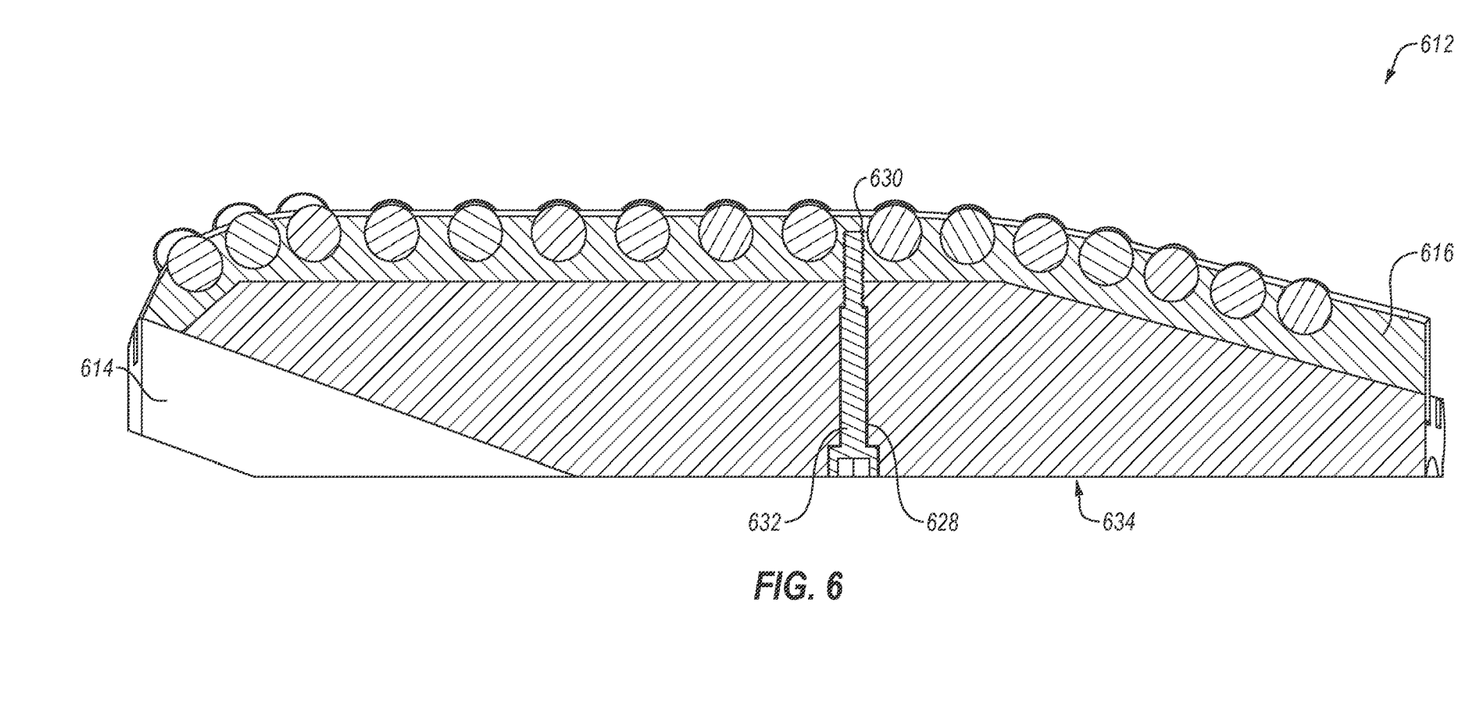
FIG. 6 is a representation of a cross-sectional view of a reamer block, according to at least one embodiment of the present disclosure.

FIG. 6 is a representation of a cross-sectional view of a reamer block 612, according to at least one embodiment of the present disclosure. In the embodiment shown, the body 614 includes a bore 628. The bore 628 extends through the body 614. A cutter pocket holder 616 connected to the body 614 may include a body bore 630. In other words, the bore 628 may extend at least partially into the body 614 with a body bore 630 portion. A mechanical fastener 632 may be inserted into the bore 628 from a bottom face 634 of the body 614 and into the body bore 630. The mechanical fastener 632 may be connected (e.g., threaded, connected with an expansion bolt) to the cutter pocket holder 616. Thus, the mechanical fastener 632 may secure the cutter pocket holder 616 to the body 614. In some embodiments, the mechanical fastener 632 may be a bolt, a screw, an expansion bolt, or other mechanical fastener. By extending the bore 628 completely through the body 614 and into the cutter pocket holder 616, the bore 628 and the mechanical fastener 632 may not be exposed to the formation during reaming, which may increase the operational life of the mechanical fastener 632, and increase the ease of replacement of the cutter pocket holder 616. In some embodiments, the cutter pocket holder 616 may be brazed to the body 614 in addition to the mechanical fastener 632. In some embodiments, the body 614 may include a plurality of bores 628, the cutter pocket holder 616 may include a plurality of body bores 630, and the cutter pocket holder 616 may be secured to the body 614 with a plurality of mechanical fasteners 632.

Figure 7:
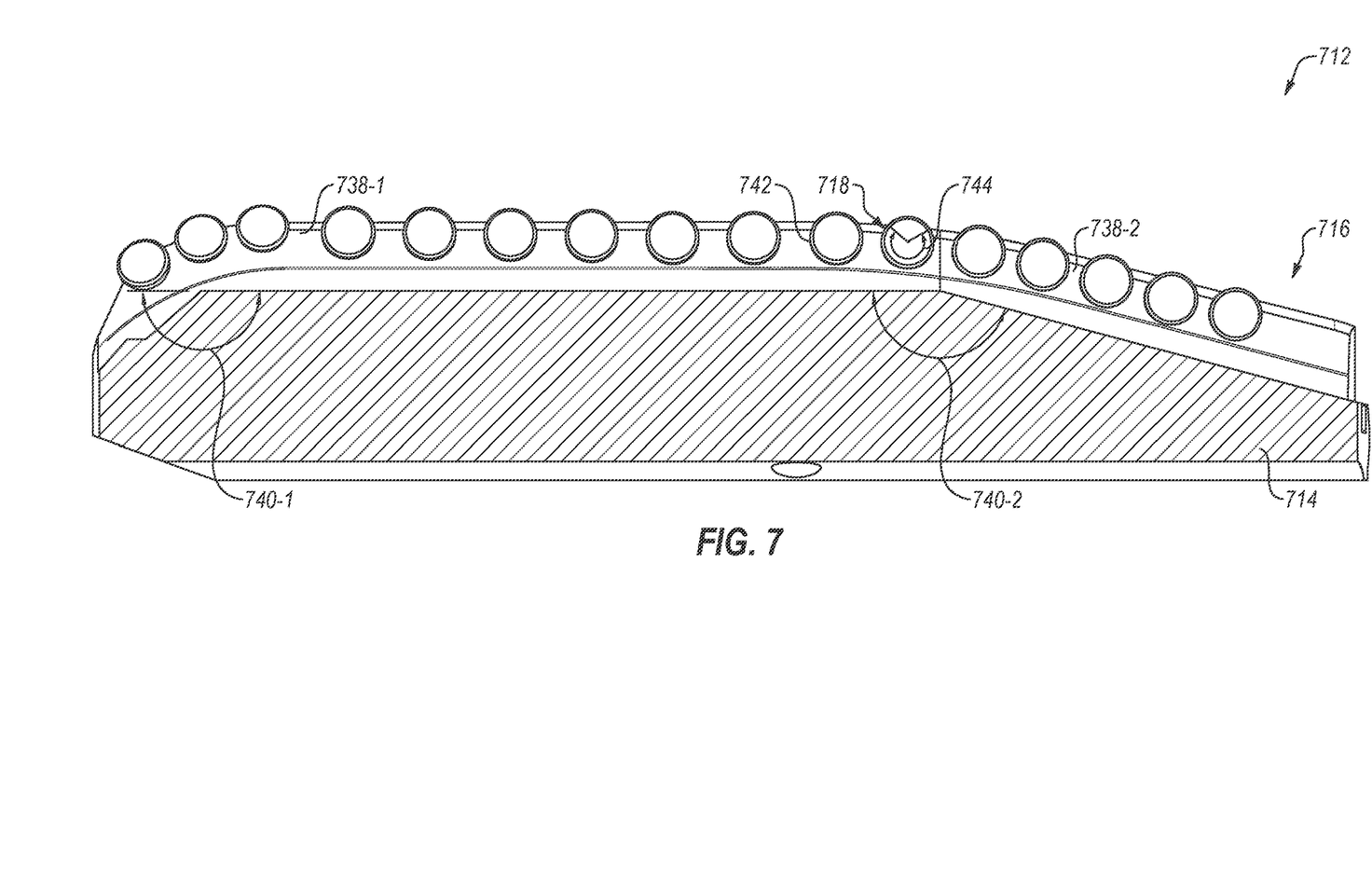
FIG. 7 is a representation of a side view of a reamer block, according to at least one embodiment of the present disclosure.

FIG. 7 is a representation of a side view of a reamer block 712, according to at least one embodiment of the present disclosure. In the embodiment shown, a cutter pocket holder 716 may be split into a first portion 738-1 (e.g., a back-reaming portion, an uphole portion) and a second portion 738-2 (e.g., a downreaming portion, a downhole portion). The first portion 738-1 and the second portion 738-2 may be connected to the body 714 longitudinally adjacent to each other. In some embodiments, the first portion 738-1 may be connected to the body 714 with a first longitudinal angle 740-1 and the second portion 738-2 may be connected to the body 714 with a second longitudinal angle 740-2. The second longitudinal angle 740-2 may determine how aggressively the reamer 712 may ream the borehole. The first longitudinal angle 740-1 may determine how the first portion 738-1 engages with the borehole. In this manner, the outer profile of the reamer block may be changed and/or customized to an operator's preferences.

In some embodiments, the first portion 738-1 may be connected to the body 714 with a first connection and the second portion 738-2 may be connected to the body 714 with a second connection. For example, the first connection may be a dovetail connection, and the second connection may be a drop-in connection. In some embodiments, both the first connection and the second connection may be the same. For example, both the first connection and the second connection may be welded, brazed, connected with a mechanical fastener, or otherwise connected to the body 714. In some embodiments, the first connection and the second connection may be different. For example, the first connection may be a braze and the second connection may be a mechanical fastener. In some embodiments, the first connection may be a dovetail, which is slid onto the body 714 of the reamer block 712. The second connection may be any type of connection, and the second portion 738-2 may hold the first portion 738-1 in place, without any braze, weld, mechanical fastener, or other connection to the body for the second portion.

The cutter pockets 718 include an inner wall 742 with a wall arc 744 being the number of degrees the inner wall 742 extends around a circle defined by the inner wall 742. In other words, the wall 744 arc is the circumferential extent of the inner wall 742. In some embodiments, the wall arc 744 may be greater than 180°. For example, the wall arc 744 may be 190°, 200°, 210°, 220°, 225°, 270°, 315°, 360°, or any value therebetween. A cutter pocket 718 with a wall arc 744 of greater than 180° may be a front-loading cutter pocket, or slide-in cutter pocket rather than a radial-loading cutter pocket. In other words, the cutting element may be slid into the cutter pocket 718 from the front opening (i.e., circumferential face) of the cutter pocket 718. The wall arc 744 angle may at least partially retain the cutting element from removal during operation of the reamer block 712.

Figure 8:
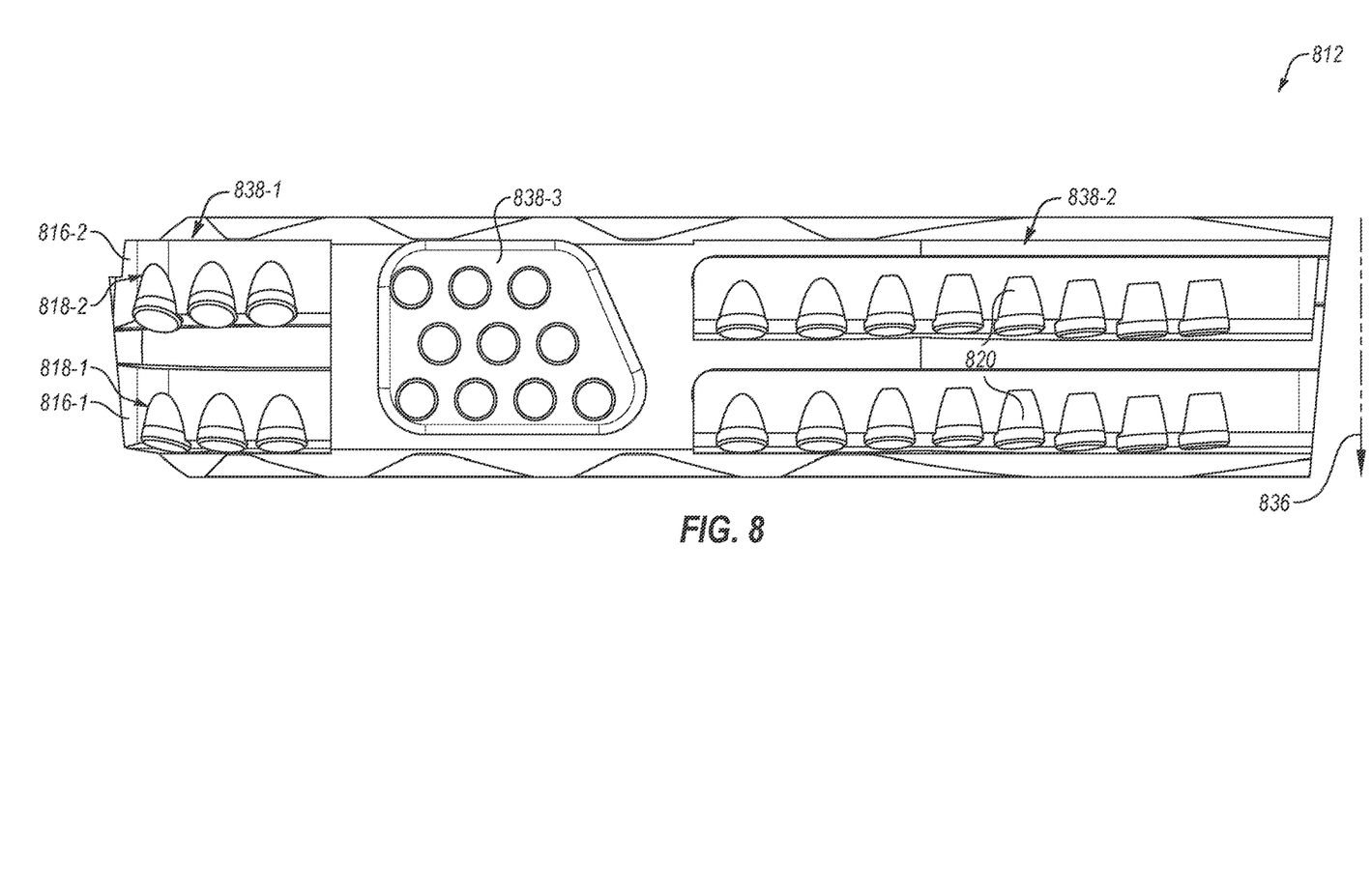
FIG. 8 is a representation of a top-down view of a reamer block, according to at least one embodiment of the present disclosure.

FIG. 8 is a representation of a top-down view of a reamer block 812, according to at least one embodiment of the present disclosure. In the embodiment shown, the reamer block 812 rotates in a rotational direction 836. Thus, the first cutter pocket holder 816-1, and a first set of cutting elements inserted into the first set of cutter pockets 818-1 on the first cutter pocket holder 816-1, may engage the formation first. A second cutter pocket holder 816-2, and a second set of cutting elements inserted into the second set of cutter pockets 818-2 on the second cutter pocket holder 816-2, may engage the formation second.

In the embodiment shown, the second set of cutter pockets 818-2 may trail the first set of cutter pockets 818-1. In other words, the second set of cutter pockets 818-2 may at least partially rotationally overlap the first set of cutter pockets 818-2. In some embodiments, the second set of cutter pockets 818-2 (and the associated second set of cutting elements) may follow the same cutting path as the first set of cutter pockets 818-1 (and the associated first set of cutting elements). Thus, the second set of cutting elements may be backup cutting elements for the first set of cutting elements. In some embodiments, the second set of cutter pockets 818-2 may follow a different cutting path as the first set of cutter pockets 818-1. In the embodiment shown, the first set of cutter pockets 818-1 has a first quantity of cutter pockets and the second set of cutter pockets 818-2 has a second quantity of cutter pockets, with the first quantity of cutter pockets being the same as the second quantity of cutter pockets. In some embodiments, the first quantity of cutter pockets may be different from the second quantity of cutter pockets.

In some embodiments, the type (e.g., grade, density, size, cutting face shape) of cutting element inserted into each cutter pocket (collectively 818) may be the same. In some embodiments, the type of cutting element inserted into each cutter pocket 818 may be different.

In the embodiment shown, the first cutter pocket holder 816-1 is installed at a rotationally front location and the second cutter pocket holder 816-2 is installed at a rotationally rear location. Conventionally, a first row of cutter pockets may be installed as front-loading cutter pockets (e.g., having a wall arc of greater than 180°). A second row of cutter pockets may be drop-in cutter pockets. In other words, the second row of cutter pockets may have a wall arc (e.g., wall arc 644 of FIG. 6) of 180° or less. In this manner, the cutting elements may be installed by lowering the cutting element from the upper surface. This connection may be weaker than a front-loading connection and may use more brazing to secure the cutting element to the cutter pockets.

Furthermore, manufacturing the drop-in cutter pocket may be more expensive than manufacturing a front-loading cutter pocket.

In the embodiment shown, cutting elements may be installed in the second cutter pocket holder 816-2 before the second cutter pocket holder 816-2 is connected to the body 814. Because the cutting elements are installed in the second cutter pocket holder 816-2 before connecting the second cutter pocket holder 816-2 to the body 814, then the second row of cutter pockets 818-2 may be front-loading (e.g., slide-in) cutter pockets. Because a front-loading cutter pocket 818 extends around more than 180° of the cutting element, a front-locating cutter pocket may be stronger. Furthermore, this shape may be easier to manufacture, thereby decreasing manufacturing costs. For example, additively manufacturing the cutter pockets 818 may not require any post-manufacturing processing, such as machining of the body 814. Machining of the body 814 after the body 814 has been manufactured may be time consuming and expensive. Furthermore, a top-loading cutter pocket may be manufactured with a dog-bone shape. In other words, the top-loading cutter pocket may have an annular ring around the end of the cutter pocket, which may be expensive to individually manufacture. Thus, by utilizing front-loading cutter pockets on both the first cutter pocket holder 816-1 and the second cutter pocket holder 816-2, the cutter pocket holders 816 may less expensive to manufacture.

In the embodiment shown, the reamer block 812 includes a third portion 838-3 (e.g., a gauge portion). The gauge portion 838-3 may help to maintain a reamed borehole diameter. In some embodiments, the gauge portion 838-3 is configured to stabilize the tool having the reamer block 812. Exposure of cutting elements on the gauge portion 838-3 may be less than or equal to the exposure of the outermost cutting elements 820 in the first cutter pocket holder 816-1 and the second cutter pocket holder 816-2. In some embodiments, the gauge portion may be integral with the body 814. In some embodiments, the gauge portion may be separately manufactured and attached to the body 814 as described herein. In some embodiments, the third portion 838-3 may be arranged longitudinally between a first portion 838-1 of the first cutter pocket holder 816-1 and a second portion 838-2 of the first cutter pocket holder 816-1.

Figure 9:
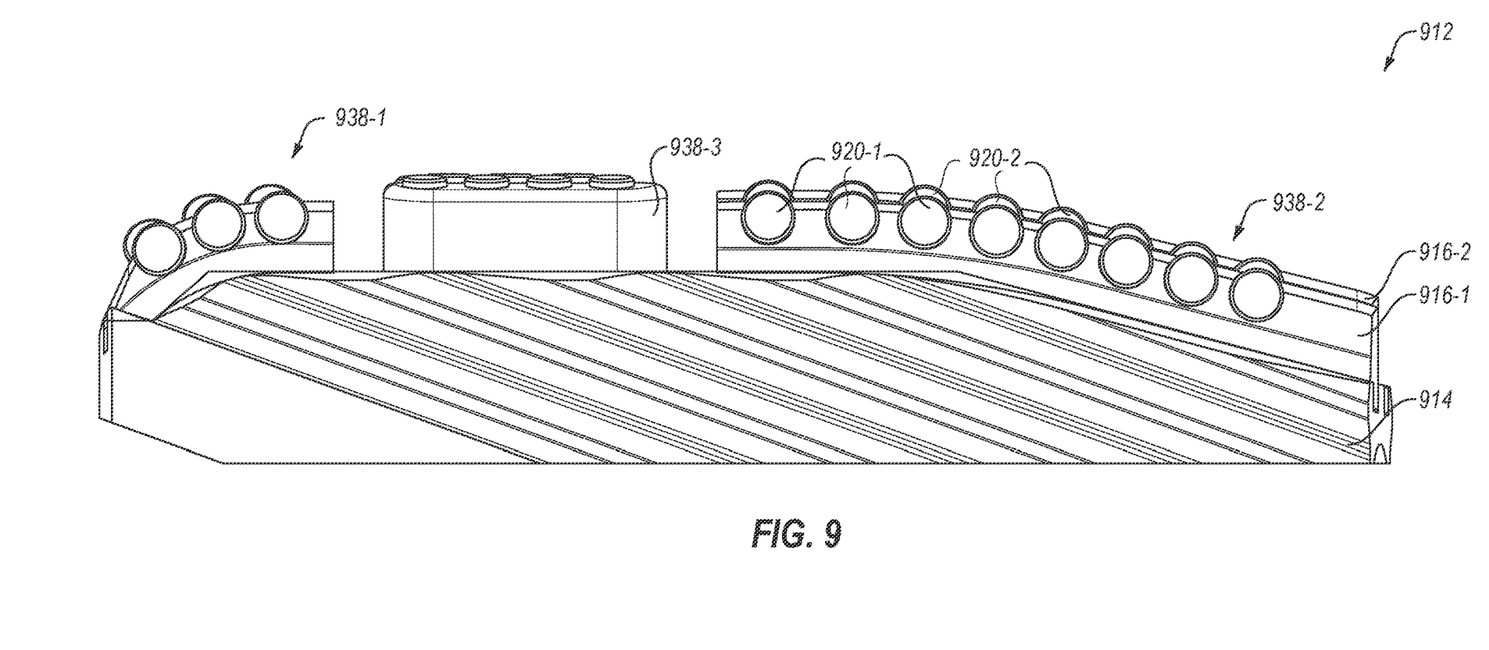
FIG. 9 is a representation of a side view of a reamer block, according to at least one embodiment of the present disclosure.

FIG. 9 is a representation of a side view of a reamer block 912, according to at least one embodiment of the present disclosure. For example, the reamer block 912 may be a side view of the reamer block with a gauge portion 938-3, first portions 938-1 of the first cutter pocket holder 916-1 and the second cutter pocket holder 916-2, and second portions 938-2 of the first cutter pocket holder 916-1 and the second cutter pocket holder 916-2. In the embodiment shown, a first cutter pocket holder 916-1 is located radially inward from a second cutter pocket holder 916-2. In other words, the second cutter pocket holder 916-2 may have a larger exposure than the first cutter pocket holder 916-1. In some embodiments, the second cutter pocket holder 916-2 may have a larger height than the first cutter pocket holder 916-1. In some embodiments, a first receiving pocket in the body 914 of the reamer block 912 for the first cutter pocket holder 916-1 may be located radially inward from a second receiving pocket. Having the second cutter pocket holder 916-2 located radially outward from the first cutter pocket holder 916-1 may cause the second set of cutting elements 920-2 installed in the second cutter pocket holder 916-2 to perform more cutting than the first set of cutting elements 920-1 installed in the first cutter pocket holder based at least in part on the difference in exposure between the first cutter pocket holder 916-1 and the second cutter pocket holder 916-2. In some embodiments, the first set of cutting elements may be backup cutting elements. In other words, as the second set of cutting elements wears and/or breaks, the first set of cutting elements may continue cutting, thereby extending the effective operational life of the reamer block.

Figure 10:
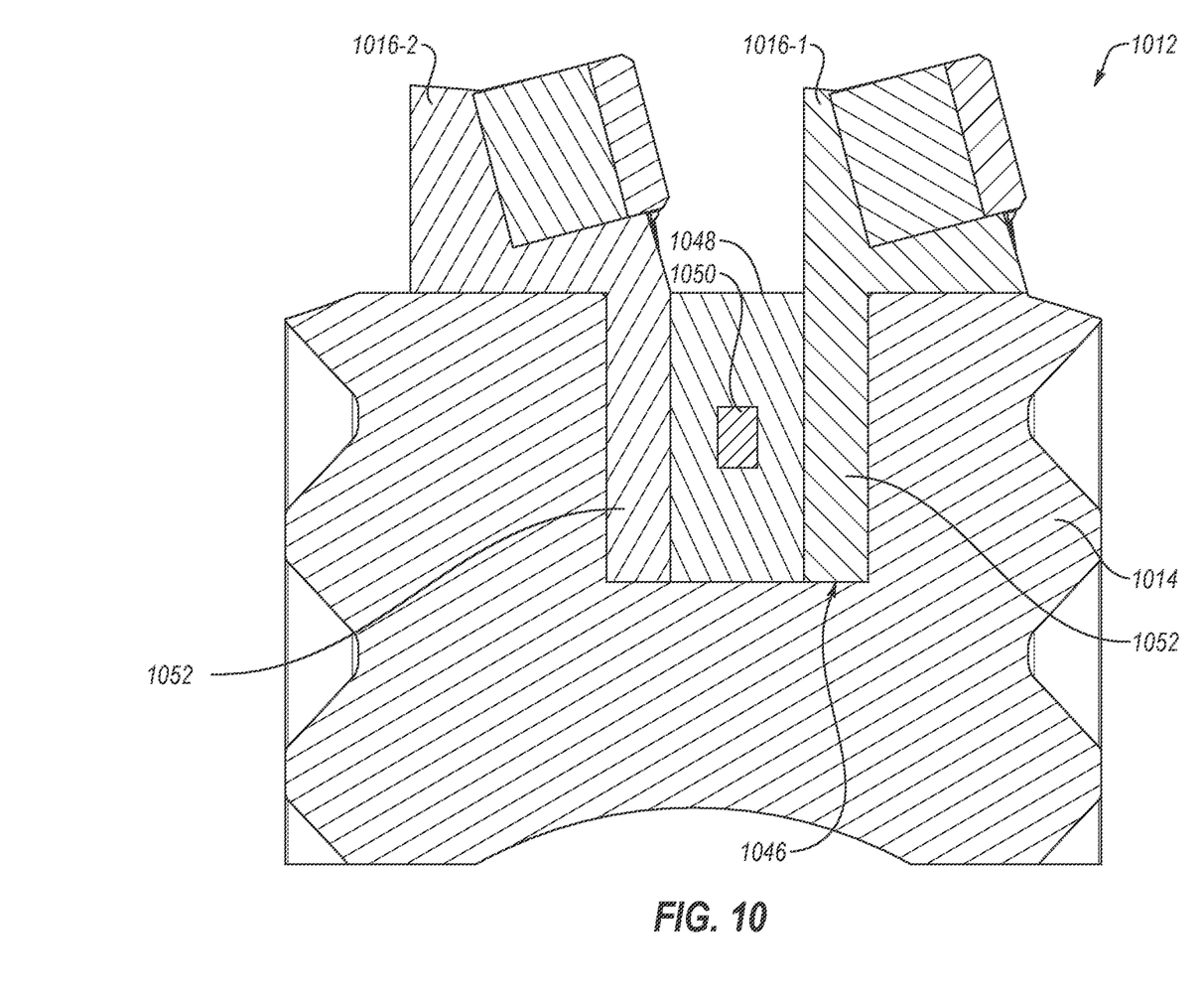
FIG. 10 is a representation of a cross-sectional view of a reamer block, according to at least one embodiment of the present disclosure.

FIG. 10 is a representation of a reamer block 1012, according to at least one embodiment of the present disclosure. In the embodiment shown, the body 1014 includes an insert pocket 1046. The insert pocket 1046 may be located between a first cutter pocket holder 1016-1 and a second cutter pocket holder 1016-2. In some embodiments, an insert or spacer 1048 may be placed (e.g., inserted) into the insert pocket 1046. The spacer 1048 may include one or more sensors 1050. For example, the spacer 1048 may include force sensors, accelerometers, gyroscopes, gamma-ray sensors, torque sensors, strain gauges, pressure sensors, other sensors, and combinations thereof.

The one or more sensors 1050 may be placed on the reamer block 1012 close to the cutting elements. Measurements taken closer to the cutting elements are generally more representative of measurements taken further from the cutting elements. Thus, by locating a spacer 1048 containing one or more sensors 1050 between the first cutter pocket holder 1016-1 and the second cutter pocket holder 1016-2, the measurements taken may be more representative of conditions on the reamer block 1012 than from other sensors located inside a tool housing, or on the back face of the reamer block.

In the embodiment shown, the cutter pocket holders 1016-1, 1016-2 each include a protrusion 1052 that extends into the insert pocket 1046. In the embodiment shown, the first cutter pocket holder 1016-1 and the second cutter pocket holder 1016-2 may include a protrusion 1052 that inserts into the same insert pocket 946. In some embodiments, the protrusion 1052 may increase the strength of the connection between the cutter pocket holder 1016 and the body 1014 of the reamer block 1012. In some embodiments, the protrusion 1052 may include one or more sensors 1050.

In some embodiments, one of the cutter pocket holders 1016 may connect to the body 1014 with a separate connection than the insert or spacer 1048. For example, the body 1014 may include a receiving pocket (e.g., receiving pocket 222 of FIG. 2) and the cutter pocket holder 1016 may include a connecting protrusion (e.g., connecting protrusion 224 of FIG. 2). In some embodiments, the body 1014 may include a plurality of insert pockets 1046, such as to receive a plurality of spacers 1048 and sensors 1050. In some embodiments, the plurality of insert pockets 1046 may be separate from the receiving pockets that receive the cutter pocket holders 1016. In some embodiments, the plurality of insert pockets 1046 may be the same as the receiving pockets that receive the cutter pocket holders 1016.

INDUSTRIAL APPLICABILITY

This disclosure is generally related to devices, systems, and methods for reamer blocks and other expandable tool blocks. Reamer blocks may include one or more cutting elements. For example, a reamer block may include one or more rows of cutting elements. According to embodiments of the present disclosure, a reamer block may include a cutter pocket holder connected to a body of the reamer block. The cutter pocket holder may include a plurality of cutter pockets. Individual cutting elements may be inserted into the cutter pockets, and the cutter pocket holder connected to a reamer body. In this manner, a standard reamer body may be developed, and individual cutter pocket holders designed according to the unique conditions of a wellbore and preferences of an operator. This may reduce manufacturing costs, increase the ease of inventory management, and allow for customization of the cutting element profile and/or pattern.

In some embodiments, the cutter pocket holder may be connected to the body using any mating connection. The mating connection may be any connection configured to retain the cutter pocket holder to the body. The mating connection may include a pin and pocket, where the pin is in either the cutter pocket holder or the body, a dovetail connection, a brazed connection, a welded connection, or any other mating connection. For example, the cutter pocket holder may be brazed to the body, welded to the body, connected to the body with a mechanical fastener, connected to the body with an interlocking connection, any other mating connection, and combinations thereof. In some embodiments, the body may include a receiving pocket. The cutter pocket holder may include a connecting protrusion. The connecting protrusion may be complementary to the receiving pocket. In other words, the connecting protrusion may be inserted into the receiving pocket. In some embodiments, the receiving pocket may have a receiving pocket profile (e.g., a receiving pocket cross-sectional shape) and the connecting protrusion may have a connecting protrusion profile (e.g., a connecting protrusion cross-sectional shape), and the receiving pocket profile and the connecting protrusion profile may be the same (e.g., the receiving pocket cross-sectional shape and the connecting protrusion cross-sectional shape may be the same). In some embodiments, the connecting protrusion may drop-in to the receiving portion (e.g., be moved radially inward and/or outward relative to each other). In some embodiments, the body 214 may include a connecting protrusion and the cutter pocket holder 216 may include a receiving pocket.

In some embodiments, the receiving pocket and the connecting protrusion may at least partially retain the cutter pocket holder onto the body. For example, the receiving pocket may at least partially provide resistance to lateral removal of the cutter pocket holder from the body. In some examples, the receiving pocket may at least partially provide resistance to radial removal from the body. For example, the receiving pocket may include a dovetail pocket and the connecting protrusion may include a dovetail pin. In some embodiments, the dovetail pin of the connecting protrusion may slide into the dovetail pocket of the receiving pocket.

In some embodiments, the cutter pocket holder may be connected to the body with a mechanical fastener. For example, a bolt, screw, pin, ring, or other mechanical fastener may connect the cutter pocket holder to the body. In some embodiments, a bore may be screwed through a bottom face of the body and into the cutter pocket holder. In some embodiments, the bore may only extend partially (e.g., not fully) through the cutter pocket holder. The mechanical fastener may be inserted through the bore and secure the cutter pocket holder to the body. By extending the bore completely through the body and partially through the cutter pocket holder, the bore and the fastener may not be exposed to the formation during reaming, which may increase the operational life of the fastener, and increase the ease of replacement of the cutter pocket holder. In some embodiments, the bore and the mechanical fastener may extend completely through both the body and the cutter pocket holder. This may make installation and access to the mechanical fastener simple and quick. In some embodiments, a bore may extend through the cutter pocket holder and at least partially into the body.

In some embodiments, the body may include a plurality of splines. The splines may help to direct the body in the radial direction based on longitudinal movement (e.g., into and out of the page). The cutting elements include a cutting face. The cutting face of the cutting elements may engage the formation as the body rotates in the circumferential direction. Thus, when extended (e.g., when the body is moved longitudinally in the housing, and the splines extend the body in the radial direction), the cutting elements may be extended to the formation, and the cutting face may engage and degrade the formation. In this manner, the reamer block may widen a borehole.

In some embodiments, the cutter pocket holder may include a first portion and a second portion. The first portion and the second portion may be connected to the body longitudinally adjacent to each other. In some embodiments, the first portion may be connected to the body with a first longitudinal angle and the second portion may be connected to the body with a second longitudinal angle. In this manner, the outer profile of the reamer block may be changed and/or customized to an operator's preferences.

In some embodiments, the first portion may be connected to the body with a first connection and the second portion may be connected to the body with a second connection. For example, the first connection may be a dovetail connection, and the second connection may be a drop-in connection. In some embodiments, both the first connection and the second connection may be the same. For example, both the first connection and the second connection may be welded, brazed, connected with a mechanical fastener, or otherwise connected to the body. In some embodiments, the first connection and the second connection may be different. For example, the first connection may be brazed and the second connection may be a mechanical fastener. In some embodiments, the first connection may be a dovetail, which is slid onto the body of the reamer block. The second connection may be any type of connection, and the second portion may hold the first portion in place, without any braze, weld, mechanical fastener, or other connection to the body for the second portion.

In some embodiments, the cutter pocket holder may be manufactured from any material. For example, the cutter pocket holder may be manufactured from steel alloys, aluminum alloys, nickel alloys, other metal alloys, ceramics, and combinations thereof. In some embodiments, the cutter pocket holder may be manufactured from an ultrahard material. As used herein, the term "ultrahard" is understood to refer to those materials known in the art to have a grain hardness of about 1,500 HV (Vickers hardness in kg/mm2) or greater. Such ultrahard materials can include but are not limited to diamond, sapphire, moissantite, hexagonal diamond (Lonsdaleite), cubic boron nitride (cBN), polycrystalline cBN (PcBN), Q-carbon, binderless PcBN, diamond-like carbon, boron suboxide, aluminum manganese boride, metal borides, boron carbon nitride, PCD (including, e.g., leached metal catalyst PCD, non-metal catalyst PCD, and binderless PCD or nanopolycrystalline diamond (NPD)) and other materials in the boron-nitrogen-carbon-oxygen system which have shown hardness values above 1,500 HV, as well as combinations of the above materials. In some embodiments, the ultrahard material may have a hardness values above 3,000 HV. In other embodiments, the ultrahard material may have a hardness value above 4,000 HV. In yet other embodiments, the ultrahard material may have a hardness value greater than 80 HRa (Rockwell hardness A).

In some embodiments, the cutter pocket holder may be additively manufactured. In some embodiments, additively manufactured components may be more erosion and/or abrasion resistant than cast and/or machined components. Therefore, in some embodiments, the cutter pocket holder may not include any applied hardfacing. In some embodiments, additively manufactured components may include fully or partially enclosed pockets and/or channels for sensors and fluid passage. For example, additively manufacturing the cutter pockets may not require any post-manufacturing processing, such as machining of the body. Machining of the body after the body has been manufactured may be time consuming and expensive. Furthermore, a top-loading cutter pocket may be manufactured with a dog-bone shape. In other words, the top-loading cutter pocket may have an annular ring around the end of the cutter pocket, which may be expensive to individually manufacture. Thus, by utilizing front-loading cutter pockets on both the first cutter pocket holder and the second cutter pocket holder, the cutter pocket holders 816 may less expensive to manufacture.

In some embodiments, the reamer block may include a third portion (e.g., a gauge portion). The gauge portion may help to maintain a reamed borehole diameter. In some embodiments, the gauge portion may be integral with the body. In some embodiments, the gauge portion may be separately manufactured and attached to the body as described herein.

In some embodiments, the cutter pocket holder includes a plurality of cutter pockets. The cutter pockets may be configured to receive a cutting element. In other words, a cutting element may be inserted into and connected to the cutter pockets. For example, the cutting element may be brazed, welded, connected with a mechanical fastener (e.g., ring), or otherwise connected to the cutter pockets. In some embodiments, the cutter pockets may be machined into the cutter pocket holder. In some embodiments, the cutter pockets may be cast into the cutter pocket holder. In some embodiments, the cutter pockets may be additively manufactured into the cutter pocket holder.

The cutter pockets include an inner wall with a wall arc being the number of degrees the inner wall extends around a circle defined by the inner wall. In other words, the wall arc is the circumferential extent of the inner wall. In some embodiments, the wall arc may be greater than 180°. For example, the wall arc may be 190°, 200°, 210°, 220°, 225°, 270°, 315°, 360°, or any value therebetween. A cutter pocket with a wall arc of greater than 180° may be a front-loading cutter pocket, or slide-in cutter pocket. In other words, the cutting element may be slid into the cutter pocket from the front opening of the cutter pocket. The wall arc angle may at least partially retain the cutting element from removal during operation of the reamer block.

In some embodiments, a plurality of cutter pocket holders may be connected to the body. For example, a first cutter pocket holder may be installed at a rotationally front location and a second cutter pocket holder may be installed at a rotationally rear location. Conventionally, a first row of cutter pockets may be installed as front-loading cutter pockets (e.g., having a wall arc of greater than 180°). A second row of cutter pockets may be drop-in cutter pockets. In other words, the second row of cutter pockets may have a wall arc of 180° or less. In this manner, the cutting elements may be installed by lowering the cutting element from the upper surface. This connection may be weaker than a front-loading connection, and may use more brazing to secure the cutting element to the cutter pockets. Furthermore, manufacturing the drop-in cutter pocket may be more expensive than manufacturing a front-loading cutter pocket. In some embodiments, more than two cutter pocket holders may be installed on the body of the reamer block. For example, three, four, five, six, seven, eight, nine, ten, or more cutter pocket holders may be installed on the body of the reamer block.

In some embodiments the cutting elements may be installed in the cutter pocket holder before the cutter pocket holder is connected to the body. Because the cutting elements are installed in the cutter pocket holder first, then the second row of cutter pockets (e.g., on the second, or rotationally rearward cutter pocket holder) may be front-loading (e.g., slide-in) cutter pockets. This may increase the strength of the cutter pocket and/or decrease manufacturing costs.

In some embodiments, brazing the cutting elements to the cutter pocket holder, rather than to the entire body, may improve the quality of the braze. For example, vacuum brazing is a method of brazing where the parts to be brazed (e.g., the cutter pocket holder and the cutting element) and the braze material are heated in a vacuum or low pressure environment. This may reduce the number of micro bubbles in the braze, which may thereby improve the strength of the braze. The cutter pocket holders may be small enough to fit inside the vacuum brazing chamber.

In some embodiments, brazing the cutting elements to the cutter pocket holder may reduce the amount of post-brazing processing of the reamer block. For example, heat from the brazing process (e.g., heating the body, the cutting elements, and braze material to the melting temperature of the braze material) may cause deformation, warping, bending, or other change of shape to the heated components. After brazing, any heat deformation on the reamer block may be machined away (possibly by hand) to return the reamer block to the final dimensions. By brazing the cutting elements to the cutter pocket holder separately from the body, heat from the brazing process may only deform the cutter pocket holder. This may be because the body is not heated during brazing. Therefore, the cutter pocket holder, which is smaller than the body, may be the only component of the assembly to experience heat deformation, if any at all. Therefore, a smaller amount of material is deformed, and post-brazing processing may be reduced, eliminated, and/or automated. This may save manufacturing time and money.

In some embodiments, separate reamer body and cutter pocket holders may help improve inventory management. For example, inventory management is optimized (e.g., made easier) when there are fewer part numbers to track and store. Conventionally, reamer blocks may be customized for each customer and/or jobsite. Thus, a large inventory of unique reamer blocks may be maintained. In some embodiments, a base reamer block body, or several sizes and/or shapes of base reamer block bodies, may be manufactured and stored. This may streamline the manufacturing process, and improve the ease of inventory management of the reamer blocks. Furthermore, in some embodiments, one or several different cutter pocket holders may be designed and manufactured. The cutter pocket holders may be mixed-and-matched with the reamer blocks to create a variety of different cutter reamer blocks.

In some embodiments, the first cutter pocket holder and the second cutter pocket holder may be identical. In other words, the first cutter pocket holder and the second cutter pocket holder may have the same size, shape, material composition, cutter pocket pattern, and so forth. In this manner, the first cutter pocket holder and the second cutter pocket holder may be interchangeable. This may help to further reduce the number of parts for the warehouse and/or the operator to track.

In some embodiments, the second plurality of cutter pockets may at least partially rotationally overlap the first plurality of cutter pockets. In other words, the first cutter pockets and the second cutter pockets may follow the same rotational path. In this manner, a first set of cutting elements in the first set of cutter pockets may be a primary set of cutting elements, which may perform a majority of the cutting of the formation, and a second set of cutting elements in the second set of cutter pockets may be a secondary set of cutting elements, which may be secondary cutting elements. In other words, the second set of cutting elements may be back-up cutting elements, and follow the same cutting path as the first set of cutting elements.

In some embodiments, the first set of cutter pockets may follow a different cutting path than the second set of cutter pockets. In some embodiments, the first set of cutter pockets may have a first cutter pocket pattern, and the second set of cutter pockets may have a second cutter pocket pattern. Cutter pockets in the second set of cutter pockets may be located between cutter pockets in the first set of cutter pockets. In some embodiments, the first cutter pocket holder may be identical to the second cutter pocket holder, but the second cutter pocket holder may be longitudinally offset from the first cutter pocket holder. For example, the receiving pocket for the first cutter pocket holder and the second cutter pocket holder may be located longitudinally offset, or include stops at a different longitudinal location. In some embodiments, the first set of cutter pockets has a first quantity of cutter pockets and the second set of cutter pockets has a second quantity of cutter pockets. In some embodiments, the first quantity of cutter pockets is the same as the second quantity of cutter pockets.

In some embodiments, the first cutter pocket holder may be located radially inward from the second cutter pocket holder. In other words, the second cutter pocket holder may have a larger exposure than the first cutter pocket holder. In some embodiments, the second cutter pocket holder may have a larger height than the first cutter pocket holder. In some embodiments, the first receiving pocket for the first cutter pocket holder may be located radially inward from the second receiving pocket. Having the second cutter pocket holder located radially outward from the first cutter pocket holder may cause the second set of cutting elements installed in the second cutter pocket holder to perform more cutting than the first set of cutting elements installed in the first cutter pocket holder. In some embodiments, the first set of cutting elements may be backup cutting elements. In other words, as the second set of cutting elements wears and/or breaks, the first set of cutting elements may continue cutting, thereby extending the effective operational life of the reamer block.

In some embodiments, the body may include an insert pocket. The insert pocket may be located between the first receiving pocket and the second receiving pocket. In some embodiments, an insert may be placed (e.g., inserted) into the insert pocket. The insert may include one or more sensors. For example, the insert may include force sensors, accelerometers, gyroscopes, gamma-ray sensors, torque sensors, strain gauges, pressure sensors, other sensors, and combinations thereof.

The one or more sensors may be placed on the reamer block close to the cutting elements. Measurements taken closer to the cutting elements are generally more representative of measurements taken further from the cutting elements. Thus, by locating an insert containing one or more sensors between the first cutter pocket holder and the second cutter pocket holder, the measurements taken may be more representative of conditions on the reamer block than from sensors located inside a tool housing, or on the back face of the reamer block.

In some embodiments, one or both of the cutter pocket holders may include a protrusion that extends into the insert pocket. In some embodiments, the protrusion may increase the strength of the connection between the cutter pocket holder and the body of the reamer block. In some embodiments, the protrusion may include one or more sensors.

In some embodiments, the cutter pocket holders may connect to the body with a separate connection. For example, the body may include a receiving pocket and the cutter pocket holder may include a connecting protrusion. In some embodiments, the body may include a plurality of insert pockets. In some embodiments, the plurality of insert pockets may be separate from the receiving pockets that receive the cutter pocket holders. In some embodiments, the plurality of insert pockets may be the same as the receiving pockets that receive the cutter pocket holders.

The embodiments of the cutter pocket holders have been primarily described with reference to wellbore drilling operations; the cutter pocket holders described herein may be used in applications other than the drilling of a wellbore. In other embodiments, cutter pocket holders according to the present disclosure may be used outside a wellbore or other downhole environment used for the exploration or production of natural resources. For instance, cutter pocket holders of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A reamer block, comprising:
   a body comprising an outer profile and a plurality of splines configured to engage with splines of a housing of an expandable reamer, wherein the body comprises one of a receiving pocket and a connecting protrusion; and
   a cutter pocket holder, wherein the cutter pocket holder comprises one of the receiving pocket and the connecting protrusion, wherein the cutter pocket holder is connected to the body via an interface between the receiving pocket and the connection protrusion, the cutter pocket holder including a plurality of cutter pockets a front wall, and a rear wall, wherein the front wall and the rear wall extend in a radial direction from the outer profile of the body.

2. The reamer block of claim 1, the receiving pocket and the connecting protrusion forming a dovetail connection.

3. The reamer block of claim 1, the cutter pocket holder being connected to the body with a mechanical fastener.

4. The reamer block of claim 3, the mechanical fastener being inserted through a bottom face of the body to the cutter pocket holder.

5. The reamer block of claim 1, wherein the cutter pocket holder is additively manufactured.

6. The reamer block of claim 1, comprising a plurality of cutting elements inserted into the plurality of cutter pockets.

7. A reamer block, comprising:
   a body comprising a plurality of splines configured to engage with splines of a housing of an expandable reamer;
   a first cutter pocket holder connected to the body, the first cutter pocket holder including a first plurality of cutter pockets, a first front wall, and a first rear wall, wherein the first front wall and the first rear wall extend in a radial direction from the body, and the first rear wall is exposed to a formation during reaming; and
   a second cutter pocket holder connected to the body, the second cutter pocket holder including a second plurality of cutter pockets, a second front wall, and a second rear wall, the second cutter pocket holder being located rotationally behind the first cutter pocket holder on the body, wherein the second front wall and the second rear wall extend in the radial direction from the body, and the second rear wall is exposed to the formation during reaming, wherein the first cutter pocket holder is located radially inward of the second cutter pocket holder.

8. The reamer block of claim 7, wherein the second plurality of cutter pockets at least partially rotationally overlaps the first plurality of cutter pockets.

9. The reamer block of claim 7, the second plurality of cutter pockets following a different cutting path than the first plurality of cutter pockets.

10. The reamer block of claim 7, the second plurality of cutter pockets being front-loading cutter pockets.

11. The reamer block of claim 10, each cutter pocket of the second plurality of cutter pockets including an inner wall that with a wall arc of greater than 180°.

12. The reamer block of claim 7, wherein the first cutter pocket holder does not include any hardfacing.

13. The reamer block of claim 7, the first plurality of cutter pockets including a first quantity of cutter pockets and the second plurality of cutter pockets including a second quantity of cutter pockets, the first quantity of cutter pockets being different than the second quantity of cutter pockets.

14. The reamer block of claim 7, the body including an insert pocket, and comprising an insert located in the insert pocket between the first cutter pocket holder and the second cutter pocket holder.

15. The reamer block of claim 14, the insert including at least one sensor.

16. The reamer block of claim 14, the first cutter pocket holder and the second cutter pocket holder including a protrusion extending into the insert pocket.

17. A reamer block kit, comprising:
    a reamer body including a receiving pocket;
    a first cutter pocket holder including a first plurality of cutter pockets, the first cutter pocket holder including a first connecting protrusion configured to connect to the receiving pocket;
    a second cutter pocket holder including a second plurality of cutter pockets, the second cutter pocket holder including a second connecting protrusion configured to connect to the receiving pocket rotationally behind the first connecting protrusion of the first cutter pocket holder.

18. The kit of claim 17, wherein the first cutter pocket holder is identical to the second cutter pocket holder.

19. The kit of claim 17, comprising a plurality of cutting elements inserted into the first plurality of cutter pockets and the second plurality of cutter pockets.

* * * * *